(12) United States Patent
Krijn et al.

(10) Patent No.: US 7,866,849 B2
(45) Date of Patent: Jan. 11, 2011

(54) LIGHT-EMITTING DEVICE

(75) Inventors: Marcellinus Petrus Carolus Michael Krijn, Eindhoven (NL); Ramon Pascal Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 173 days.

(21) Appl. No.: 12/373,895

(22) PCT Filed: Jul. 13, 2007

(86) PCT No.: PCT/IB2007/052801

§ 371 (c)(1),
(2), (4) Date: Jan. 15, 2009

(87) PCT Pub. No.: WO2008/015601

PCT Pub. Date: Feb. 7, 2008

(65) Prior Publication Data

US 2009/0284984 A1 Nov. 19, 2009

(30) Foreign Application Priority Data

Jul. 31, 2006 (EP) .................................. 06118148

(51) Int. Cl.
*F21V 9/00* (2006.01)
(52) U.S. Cl. ...................... 362/293; 362/245; 362/296.1
(58) Field of Classification Search ................ 362/237, 362/240, 241, 243, 245, 293, 296.02, 296.1, 362/298, 307, 311.02; 359/641
See application file for complete search history.

(56) References Cited

U.S. PATENT DOCUMENTS

| 4,535,394 | A | * | 8/1985 | Dugre ........................ 362/231 |
| 5,951,150 | A | * | 9/1999 | Helstern ..................... 362/293 |
| 7,575,340 | B2 | * | 8/2009 | Kung et al. ................. 362/237 |
| 2004/0120647 | A1 | | 6/2004 | Sakata et al. |
| 2004/0165381 | A1 | | 8/2004 | Waters |
| 2005/0047135 | A1 | | 3/2005 | Rhoads et al. |
| 2005/0254127 | A1 | | 11/2005 | Evans et al. |
| 2009/0316397 | A1 | * | 12/2009 | Krijn et al. .................. 362/235 |
| 2010/0060859 | A1 | * | 3/2010 | Krijn et al. .................. 362/235 |

FOREIGN PATENT DOCUMENTS

| EP | 1569467 A2 | 8/2005 |
| WO | 2004107018 A1 | 12/2004 |
| WO | 2006129220 A1 | 12/2006 |

* cited by examiner

*Primary Examiner*—Y My Quach Lee

(57) ABSTRACT

A light-emitting device (100) is provided, comprising four light sources (101, 102, 103, 104) and a collimating element (105) for collimating and mixing the light from the light sources. The light-collimating element comprises three V-shaped profile surfaces (110, 120, 130) arranged with their edges (115, 125, 135) towards the light sources. The V-shaped profile surfaces are provided with dichroic filters that transmits light from the light sources that they are arranged in front of, and reflects light from the remaining light sources. Such a device is capable of collimating and mixing the light from the four light sources, such that essentially the same degree of collimation is achieved for all four light sources.

7 Claims, 3 Drawing Sheets

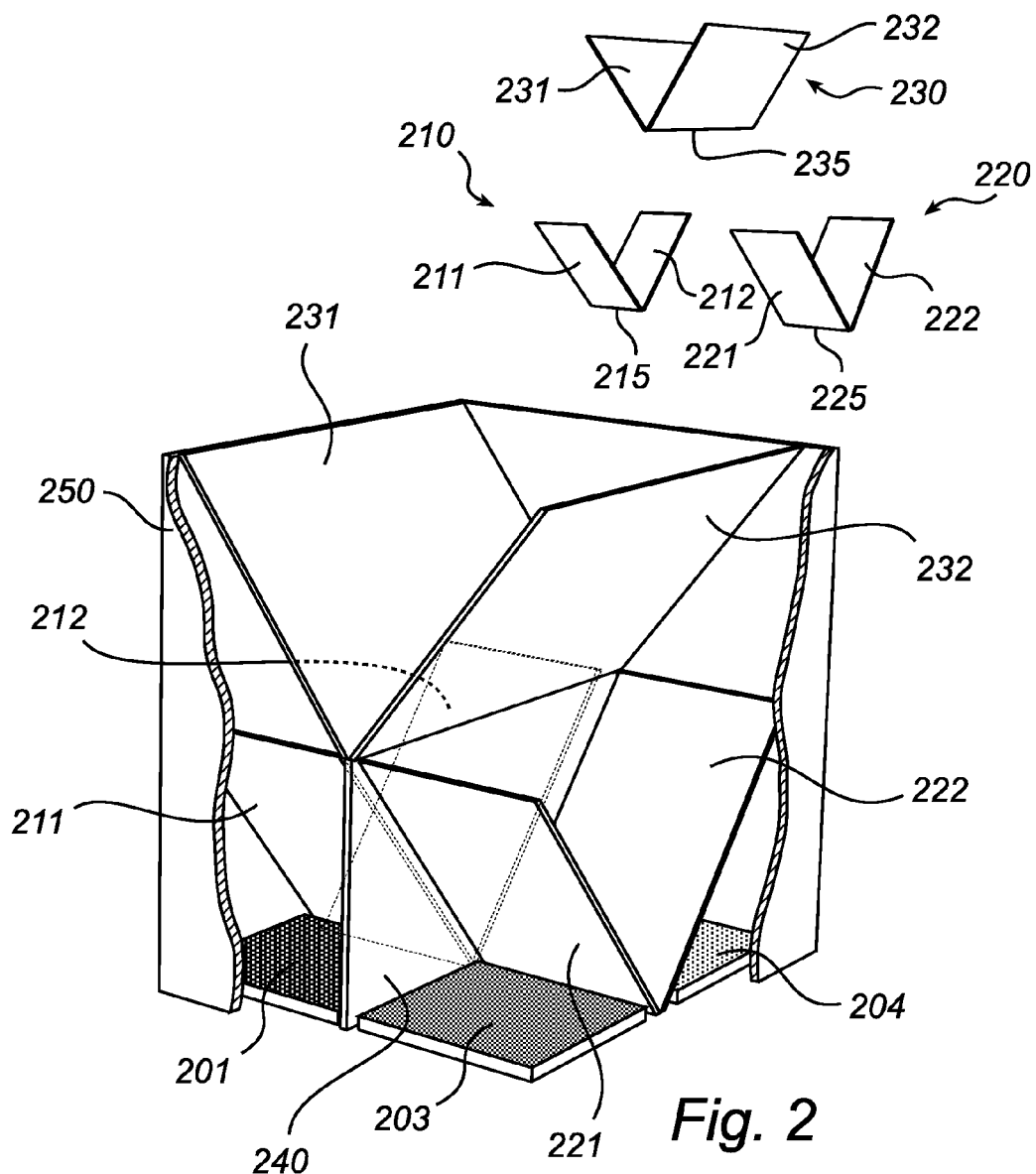
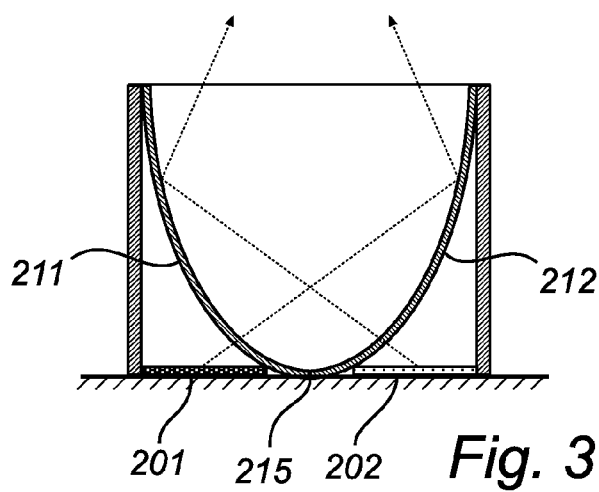
Fig. 2
Fig. 3

US 7,866,849 B2

LIGHT-EMITTING DEVICE

This application is a national stage application under 35 U.S.C. §371 of International Application No. PCT/IB2007/052801 filed on Jul. 13, 2007, and published in the English language on Feb. 7, 2008, as International Publication No. WO/2008/015601, which claims priority to European Application No. 06118148.3, filed on Jul. 31, 2006, incorporated herein by reference.

TECHNICAL FIELD

The present invention relates to a light-emitting device comprising at least a first light source adjacent to a second light source, and a third light source adjacent to a fourth light source, and a light collimating element having a receiving side facing said light sources and an opposite output side.

The present invention also relates to display devices comprising such light-emitting devices.

TECHNICAL BACKGROUND

Planar light sources are currently contemplated for several different applications, such as lamps for environmental illumination, backlights in liquid crystal displays and light sources in projection displays.

Light-emitting diodes, LEDs, may be a desirable choice of light sources in many applications, for example as the life time of LEDs are higher than the life time of incandescent bulbs, fluorescent bulbs and discharge lamps.

Further, light-emitting diodes are more power consumption efficient than incandescent bulbs and are expected to be more efficient than fluorescent tubes in a near future.

In several of these and other applications, it is often desired to achieve light of high brightness and color variability.

The brightness (B) is defined as being the amount of lumens (Φ) emitted per unit of area (A) and per unit of solid angle (Ω):

$$B = \frac{\Phi}{A\Omega}.$$

Conventionally, color variability is obtained by arranging a number of red, green, blue and amber LEDs in an array (rows, columns or a two-dimensional matrix) to form an array of color variable, independently addressable, pixels.

Color variable light of high brightness is typically obtained by stacking a high number of high-brightness LEDs, emitting in different parts of the spectrum, side by side in a matrix. The more LEDs being arranged on a certain area, the higher the ratio Φ/A becomes.

However, positioning LEDs that emit different colors side by side in itself is not an efficient way of obtaining light that is collimated as much as possible. Typically, LED emit light in an essentially Lambertian pattern, i.e. having an intensity proportional to the cosine of the angle from which it is viewed. Positioning LEDs of different colors side by side will again result in a Lambertian radiation pattern. Thus, the angular spread, proportional to Ω, is unchanged.

Conventionally, efficient collimation is obtained by leading un-collimated light into a funnel having reflective inner walls and which has a smaller cross section at the receiving side and a larger cross section at the output side. Thus, the collimator in general has an area larger than the area of the light source. Thus, by using conventional collimators, the light sources must be in spaced apart arrangement in order for the collimators to fit, which increases the area (A) in the formula above, leading to a decreased brightness.

Further, by arranging light sources in a spaced apart arrangement, the light mixing will be negatively affected.

US2004/0120647 A1, to Sakata et al, describes an optical element for mixing light from three adjacent light sources, such as a red, a green and a blue light-emitting diode. The optical element includes a first optical wave guide having a first incidence plane on which first color light is incident and an emergence plane opposed to the first incidence plane; a second optical wave guide having a second incidence plane on which second color light is incident; a third optical wave guide having a third incidence plane on which third color light is incident, the second optical wave guide and the third optical wave guide being joined to the first optical wave guide; a first dichroic filter formed on a joint plane between the first optical wave guide and the second optical wave guide to reflect the first color light and the third color light and transmitting the second color light; and a second dichroic filter formed on a joint plane between the first optical wave guide and the third optical wave guide to reflect the first color light and the second color light and transmitting the third color light, the three colors light being emerged from the emergence plane of the first optical wave guide.

However, in such an arrangement, it is not straightforward to add a fourth light-emitting diode having a fourth color. Furthermore, there is already a clear difference in degree of collimation between different colors, even without a fourth color.

SUMMARY OF THE INVENTION

It is an object of the present invention to overcome the above-mentioned problems with the prior art, and to provide a light-emitting device comprising four light sources and a collimating structure which can collimate the light from the four light sources and obtain a good color mixing, such that light of each color is collimated to essentially the same degree.

Thus, in a first aspect, the present invention relates to a light-emitting device comprising at least one set of a first light source adjacent to a second light source, and a third light source adjacent to a fourth light source, and a light collimating element having a receiving side facing said light sources and an opposite output side.

The light collimating element in one such set comprises first V-shaped profile surface arranged in front of, i.e. counted in the main direction of light propagation, said first and second light sources with its edge towards said receiving side, such that the first leg of said first V-shaped profile surface is arranged in front of said first light source and comprises a dichroic filter transmissive for light from said first light source and reflective for light of said second light source. The second leg of said first V-shaped profile surface is arranged in front of said second light source and comprises a dichroic filter transmissive for light from said second light source and reflective for light of said first light source.

The light collimating element further comprises a second V-shaped profile surface arranged in front of said third and fourth light sources with its edge towards the receiving side, such that the first leg of said second V-shaped profile surface is arranged in front of said third light source and comprises a dichroic filter transmissive for light from said third light source and reflective for light of said fourth light source, and the second leg of said second V-shaped profile surface is arranged in front of said fourth light source and comprises a dichroic filter transmissive for light from said fourth light source and reflective for light of said third light source.

A reflecting surface having an extension in the main direction of light is arranged between said first and second V-shaped profile elements.

The light collimating element further comprises a third V-shaped profile surface arranged in front of said first and second V-shaped profile surfaces with its edge towards said receiving side, such that the first leg of said third V-shaped profile surface is arranged in front of said first V-shaped profile surface and comprises a dichroic filter transmissive for light from said first and second light sources and reflective for light from said third and fourth light sources, and the second leg of said third V-shaped profile surface is arranged in front of said second V-shaped profile surface and comprises a dichroic filter transmissive for light from said third and fourth light sources and reflective for light from said first and second light sources.

Typically, the edge of said third V-shaped profile surface is arranged between said first and second V-shaped profile surface. The edge of said first V-shaped profile surface is typically arranged between said first and second light sources, and the edge of said second V-shaped profile surface is typically arranged between said third and fourth light sources.

In embodiments of the present invention, the edge of said third V-shaped profile surface is parallel to the extension of the reflecting surface, in its extension across the main direction of light propagation.

In embodiments of the present invention. the edge of said first V-shaped profile surface and/or the edge of said second V-shaped profile surface is parallel to the edge of said third V-shaped surface.

When the edge of both the first and the second V-shaped profile surface is essentially parallel to the edge of the third V-shaped profile surface, this allows for a long and narrow light-emitting device, where the four light sources are arranged on a single row.

Alternatively, the edge of said first V-shaped profile surface and/or the edge of said second V-shaped profile surface is perpendicular to the edge of said third V-shaped surface.

When the edge of both the first and the second V-shaped profile surface is essentially perpendicular to the edge of the third V-shaped profile surface, this allows for a more compact light-emitting device, for example by arranging the four light sources in a 2×2 quadrangle.

In embodiments of the present invention, the collimating structure may be arranged in a jacket comprising sidewalls. By encasing each separate light-emitting device in a jacket, all light that comes out from the device will come out at the output side of the collimating element. Thus, the light-leakage between adjacent light-emitting devices is minimized. Preferably, the surfaces of such jacket sidewalls facing the collimating structure are reflecting. When the inner surfaces of the jacket is reflective, essentially all light emitted by the light sources will be utilized and will come out at the output side of the collimating element.

In embodiments of the present invention, the dichroic filters may comprise an interference stack of alternating layers of materials having different refractive indices. Interference stacks are highly efficient as dichroic filters because they have a typically nearly zero coefficient of absorption for all wavelengths of interest. Furthermore, they can be designed with many degrees of freedom (e.g. number of layers, layer thickness, materials choice).

In embodiments of the present invention, the V-shaped profile surfaces may be constituted by self-supported wall-elements. When the dichroic filters are arranged on or as self-supporting wall-elements, the propagation medium, through which light propagates on its way from the light sources to the output side of the collimating element, may be air.

It is advantageous that the light from the light sources travels through a medium with n~1 until it encounters a filter, since this ensures that when the light crosses the interface between this medium and the filter, the angle of the light is refracted towards the normal to the layers of the filters because the filters typically have an index of refraction of 1.4-1.8 (i.e. higher than air). In other words, this limits the angle with respect to the normal at which the light traverses the active layers of the filter. This is important since the behavior of dichroic filters may depend rather strongly on the angle of incidence of the light. Thus, a filter in air with good optical quality will be easy to design.

In a second aspect, the present invention relates to a display device comprising at least two independently addressable light-emitting devices of the present invention.

BRIEF DESCRIPTION OF THE DRAWINGS

These and other aspects of the present invention will now be described in more detail, with reference to the appended drawings showing a currently preferred embodiment of the invention.

FIG. 2 illustrates a second embodiment of a light-emitting device of the present invention.

FIG. 3 illustrates an alternatively shaped V-shaped profile surface.

DETAILED DESCRIPTION OF PREFERRED EMBODIMENTS

As used herein, the term "light source" relates to any kind of light source known to those skilled in the art. For example, the term relates to incandescent bulbs, discharge lamps and light-emitting diodes.

As used herein, "light-emitting diodes" relates to all different types of light-emitting diodes (LEDs), including organic based LEDs, e.g. polymeric based LEDs, and inorganic based LEDs, which in operating mode emits light of any wavelength or wavelength interval, from ultra violet to infrared. Light-emitting diodes, in the context of this application, are also taken to encompass lasers, e.g. light-emitting diodes emitting laser light. Light-emitting diodes suitable for use in the present invention include, but are not limited to, top-emissive, side-emissive and bottom-emissive light-emitting diodes.

As used herein, the color of a light-emitting diode, e.g. a "green light-emitting diode", refers to the color, i.e. the wavelength range of the light emitted by the light-emitting diode in operational mode.

As used herein, the term "collimator" and related terms, such as "collimating element" refers to an element that is capable of receiving electromagnetic (EM) radiation, e.g. light in the interval from UV to IR, and improve the degree of collimation of the received EM-radiation (i.e. reduce the angular spread).

As used herein, the term "wavelength range" refers to both continuous and discontinuous wavelength ranges.

Figure 1:
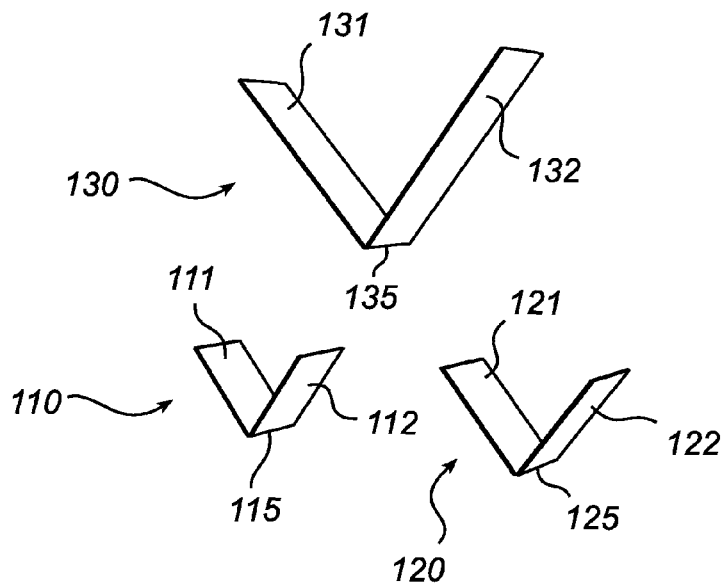
FIG. 1 illustrates a first embodiment of a light-emitting device, comprising the V-shaped profile surfaces.
Figure 1:
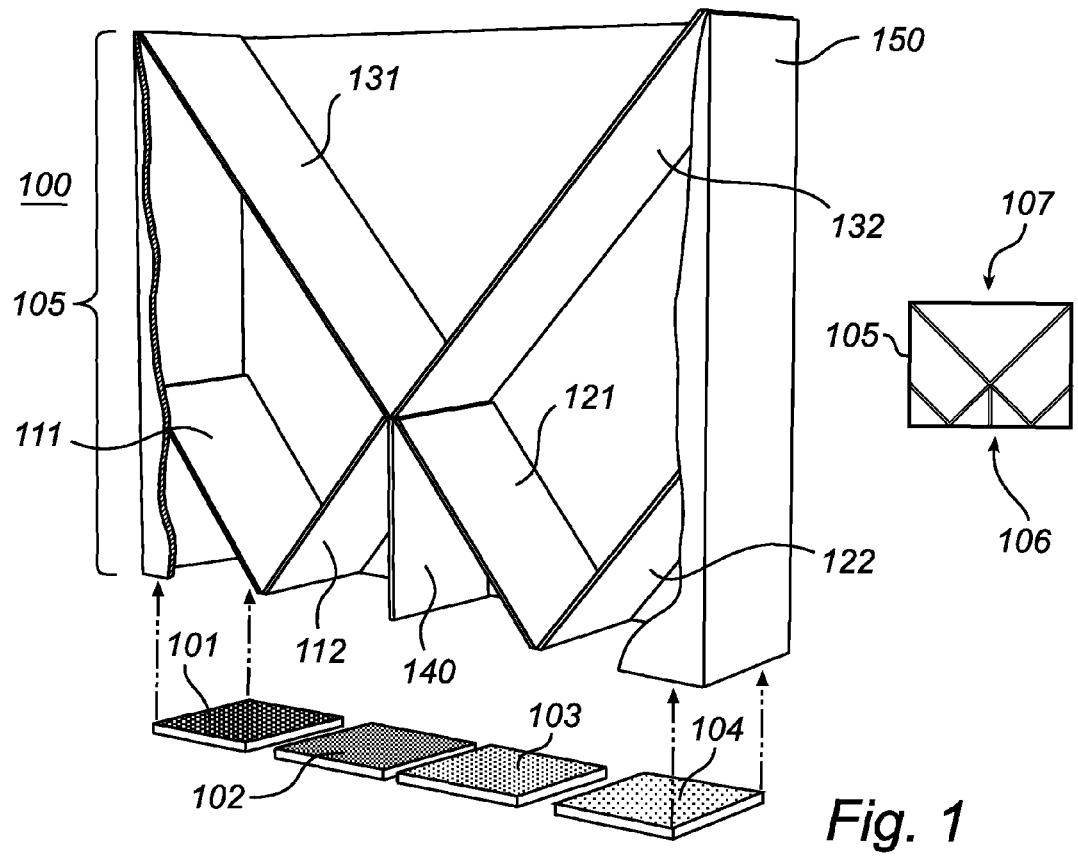

A first exemplary embodiment of a light-emitting device 100 of the present invention is illustrated in FIG. 1 and comprises one set of a first light-emitting diode 101, a second light-emitting diode 102, a third light-emitting diode 103 and a fourth light-emitting diode 104 arranged in a single row. In this exemplary embodiment, the four light sources emit light of different colors, for example, red, green, blue and amber. Further, the separate light sources may be independently addressable in order to yield a color variable light-emitting device.

The first light-emitting diode 101 is arranged adjacent to the second light-emitting diode 102, and the third light-emitting diode 103 is arranged adjacent to the fourth light-emitting diode 104.

In front of the light-emitting diodes is arranged a light collimating element 105, which has a light receiving side 106 facing the light-emitting diodes and an opposite output side 107. The light enters the light collimating element 105 through the receiving side 106 and exits the element 105 through the output side 107.

For the purposes of the present invention, directions and relative locations are indicated in relation to the main direction of light propagation within the device of the present invention, i.e. in the direction from the light sources towards the output side of the light-collimating element. Thus, "in front of" means closer to the output side of the light collimating element, and "in rear of" means closer to the light sources. Further, "in front of" and thereto associated terms, also relates to a first object being located "in front of" at least a portion of a second object, for instance being arranged in front of at least 30% of the area of the second object.

The light collimating element 105 comprises three V-shaped surfaces 110, 120, 130, also illustrated separately in FIG. 1.

Each of the V-shaped profile surfaces 110, 120, 130 comprises a first leg 111, 121, 131 and a second leg 112, 122, 132, and an extended edge 115, 125, 135 connecting the first leg 111, 121, 131 to the second leg 112, 122, 132.

As used herein, a "V-shaped profile surface" is an extended surface consisting of two legs joined by an edge. The cross-section of the V-shaped profile surface, across the extension of the edge has a V-like shape, where the first leg forms an angle to the second leg.

Further, in cross-section, legs of V-shaped profile surfaces may be curved, typically such that the legs form two convex surfaces facing each other, thus more resembling a "U" in cross-section.

The first V-shaped profile element 110 is arranged in front of the first and the second light-emitting diodes 101, 102, such that the first leg 111 thereof is arranged in front of the first light-emitting diode 101 and the second leg 112 thereof is arranged in front of the second light-emitting diode 102. The edge 115 of the first V-shaped profile element is arranged between the first and the second light-emitting diode.

The first leg 111 of the first V-shaped profile surface 110 is provided with a first dichroic filter that is transmissive for light emitted by the first light-emitting diode 101 but that is reflective for light emitted by the second light-emitting diode 102. The second leg 112 of the first V-shaped profile surface 110 is provided with a second dichroic filter that is transmissive for light emitted by the second light-emitting diode 102 but that is reflective for light emitted by the first light-emitting diode 101.

The second V-shaped profile element 120 is arranged in front of the third and the fourth light-emitting diodes 103, 104, such that the first leg 121 thereof is arranged in front of the third light-emitting diode 103 and the second leg 122 thereof is arranged in front of the fourth light-emitting diode 104. The edge 125 of the second V-shaped profile element 120 is arranged between the third and the fourth light-emitting diode.

The first leg 121 of the second V-shaped profile surface 120 is provided with a third dichroic filter that is transmissive for light emitted by the third light-emitting diode 103 but that is reflective for light emitted by the fourth light-emitting diode 104. The second leg 122 of the second V-shaped profile surface 120 is provided with a fourth dichroic filter that is transmissive for light emitted by the fourth light-emitting diode 104 but that is reflective for light emitted by the third light-emitting diode 103.

A reflecting surface 140 is arranged between the first and the second V-shaped profile surfaces 110, 120 and has an extension along the main direction of light propagation and has a first surface facing the first V-shaped profile surface 110 and a second surface facing the V-shaped profile surface 120.

The extension of the reflecting surface 140 crosswise the main direction of light propagation is essentially parallel to the extension of the edges 115, 125 of the first and second V-shaped profile surfaces and perpendicular to the extension of the row formed by the light-emitting diodes 101, 102, 103 and 104. Thus, the second and the third light-emitting diodes are separated from each other by the reflecting surface 140.

The reflecting surface 140 is arranged in order to prevent light from the second light-emitting diode 102 from encountering the first leg 121 of the second V-shaped profile surface, and to prevent light from the third light-emitting diode 103 from encountering the second leg 112 of the first V-shaped profile surface.

The third V-shaped profile surface 130 is arranged in front of the first and the second V-shaped profile surface 110, 120, such that the first leg 131 of the third V-shaped profile surface 130 is arranged in front of the first V-shaped profile surface 110, and the second leg 132 of the third V-shaped profile surface is arranged in front of the second V-shaped profile surface 120.

The edge 135 of the third V-shaped surface 130 is arranged between the first and the second V-shaped profile surfaces. The edge 135 of the third V-shaped profile surface 130 is further essentially parallel to the extension, crosswise the main direction of light propagation, of the reflecting surface 140. The edge 135 of the third V-shaped surface 130 is further essentially parallel to the edges 115, 125 of the first and the second V-shaped profile surfaces 110, 120.

The first leg 131 of the third V-shaped profile element is provided with a fifth dichroic filter that is transmissive for light from the first and the second light-emitting diodes and reflective for light from the third and fourth light-emitting diodes.

The second leg 131 of the third V-shaped profile element is provided with a sixth dichroic filter that is transmissive for light from the third and fourth light-emitting diodes and reflective for light from the first and the second light-emitting diodes.

In the present embodiment, the legs 111, 112, 121, 122, 131, 132 of the V-shaped profile surfaces are constituted by thin self-supporting wall elements, and the dichroic filters are arranged on the surfaces of these wall elements.

Thus, the medium through which light travels from the light source to the dichroic filters, between the dichroic filters and from the dichroic filters and the output side of the collimating element is typically air, vacuum or any other gaseous atmosphere.

Light from the first light-emitting diode 101 will pass through the dichroic filter arranged on the first leg 111 of the first V-shaped profile surface 110 and the dichroic filter arranged on the first leg 131 of the third V-shaped profile surface 130, but will be reflected on the dichroic filters arranged on the second leg 112 of the first V-shaped profile surface 110 and on the second leg 132 of the third V-shaped profile surface 130. As the second leg 112 of the first V-shaped profile surface 110 and the second leg 132 of the third V-shaped profile surface 130 are slanted away from the first light-emitting diode 101, the light thereof will be reflected towards the output side 107 of the collimating element 105, and thus the light from this light-emitting diode will be collimated due to reflection in these surfaces. As will be realized by those skilled in the art from the above description, an analogous reasoning can be performed also for the light from the second, third and fourth light-emitting diode of the light-emitting device of the present invention.

Thus, light from all four light-emitting diodes will be collimated and will exit the light collimating element 105 through the output side 107 thereof. Thus, collimation and mixing can be obtained in the same structure, namely the collimating element 105.

In order to decrease the amount of light not exiting the collimating element 105 through the output side 107, sidewalls may be arranged as a jacket 150 on the vertical sides of the device. Thus, essentially all light that exits the device will do so through the output side 107. In order to further increase the light utilization efficiency of the device, the inner surfaces of such a jacket 150 may be reflective, such that light encountering such a sidewall will be reflected back into the collimating element 105 and eventually exit the device through the output side 107. Such reflective inner surfaces are preferably full spectrum reflecting for highest efficiency.

The jacket can be cylindrical, i.e. having parallel sidewalls, or may be tapered, especially such that the cross-section area of the jacket 150 is smaller at the receiving side 106 of the collimating element 105 and larger at the output side 107 of the collimating element 105. This will further enhance the collimation of the light. Further, the sidewalls of the jacket 150 may be straight or curved in respect of its extension from the receiving side to the output side of the collimating element 105. When the sidewalls are curved, the inner surfaces of the jacket 150 typically form a convex surface.

A second embodiment of the present invention is illustrated in FIG. 2, comprising one set of four light-emitting diodes 201, 202, 203, 204 and a light collimating element arranged in front thereof, having a receiving side facing the light-emitting diodes and an opposite output side. The light-collimating element comprises three V-shaped profile surfaces 210, 220, 230 with their edges 215, 225, 235 towards the receiving side of the collimating element.

The first light-emitting diode 201 is adjacent to the second light-emitting diode 202. The third light-emitting diode 203 is adjacent to the fourth light-emitting diode 204. The first and the second light-emitting diode together forms a first row of light sources that are arranged adjacent and parallel to a second row of light sources, formed by the third and the fourth light-emitting diodes 203 and 204.

The first V-shaped profile element 210 is arranged in front of the first and the second light-emitting diodes 201, 202, such that the first leg 211 thereof is arranged in front of the first light-emitting diode 201 and the second leg 212 thereof is arranged in front of the second light-emitting diode 202. The edge 215 of the first V-shaped profile element is arranged between the first and the second light-emitting diode.

The second V-shaped profile element 220 is arranged in front of the third and the fourth light-emitting diodes 203, 204, such that the first leg 221 thereof is arranged in front of the third light-emitting diode 203 and the second leg 222 thereof is arranged in front of the fourth light-emitting diode 204. The edge 225 of the second V-shaped profile element 220 is arranged between the third and the fourth light-emitting diode.

The first leg 211 of the first V-shaped profile surface 210 is provided with a first dichroic filter that is transmissive for light emitted by the first light-emitting diode 201 but that is reflective for light emitted by the second light-emitting diode 202. The second leg 212 of the first V-shaped profile surface 210 is provided with a second dichroic filter that is transmissive for light emitted by the second light-emitting diode 202 but that is reflective for light emitted by the first light-emitting diode 201.

The second V-shaped profile element 220 is arranged in front of the third and the fourth light-emitting diodes 203, 204, such that the first leg 221 thereof is arranged in front of the third light-emitting diode 203 and the second leg 222 thereof is arranged in front of the fourth light-emitting diode 204. The edge 225 of the second V-shaped profile element 220 is arranged between the third and the fourth light-emitting diode.

The first leg 221 of the second V-shaped profile surface 220 is provided with a third dichroic filter that is transmissive for light emitted by the third light-emitting diode 203 but that is reflective for light emitted by the fourth light-emitting diode 204. The second leg 222 of the second V-shaped profile surface 220 is provided with a fourth dichroic filter that is transmissive for light emitted by the fourth light-emitting diode 204 but that is reflective for light emitted by the third light-emitting diode 203.

A reflecting surface 240 is arranged between the first and the second V-shaped profile surfaces 210, 220 and has an extension along the main direction of light propagation and has a first surface facing the first V-shaped profile surface 210 and a second surface facing the V-shaped profile surface 220.

The extension of the reflecting surface 240 crosswise the main direction of light propagation is essentially perpendicular to the extension of the edges 215, 225 of the first and second V-shaped profile surfaces and is parallel to and arranged between the rows formed by the first and second light-emitting diodes 201 and 202, and the third and fourth light-emitting diodes 203 and 204, respectively.

The third V-shaped profile surface 230, is arranged in front of the first and the second V-shaped profile surface 210, 220, such that the first leg 231 of the third V-shaped profile surface 230 is arranged in front of the first V-shaped profile surface 210, and the second leg 232 of the third V-shaped profile surface is arranged in front of the second V-shaped profile surface 220.

The edge 235 of the third V-shaped surface is arranged between the first and the second V-shaped profile surfaces. The edge 235 of the third V-shaped profile surface 230 is further essentially parallel to the extension, crosswise the main direction of light propagation, of the reflecting surface 240. Thus, the edge 235 of the third V-shaped surface 230 is essentially perpendicular to the edges 215, 225 of the first and the second V-shaped profile surfaces 210, 220.

The first leg 231 of the third V-shaped profile element is provided with a fifth dichroic filter that is transmissive for light from the first and the second light-emitting diodes and reflective for light from the third and fourth light-emitting diodes.

The second leg 232 of the third V-shaped profile element is provided with a sixth dichroic filter that is transmissive for light from the third and fourth light-emitting diodes and reflective for light from the first and the second light-emitting diodes.

In alternative embodiments of the present invention, all or some of the legs of the V-shaped profile surfaces comprised in a light collimating element of the present invention may have a curved cross-section, as is illustrated in FIG. 3, showing in cross-sectional view the first V-shaped profile surface of FIG. 2 in a curved variant.

By using such profile surfaces having legs with curved cross section, the collimation efficiency may be increased in that a certain degree of collimation may be achieved from a collimating element having a lower profile than a collimating element using profile surfaces having planar legs.

Figure 4:
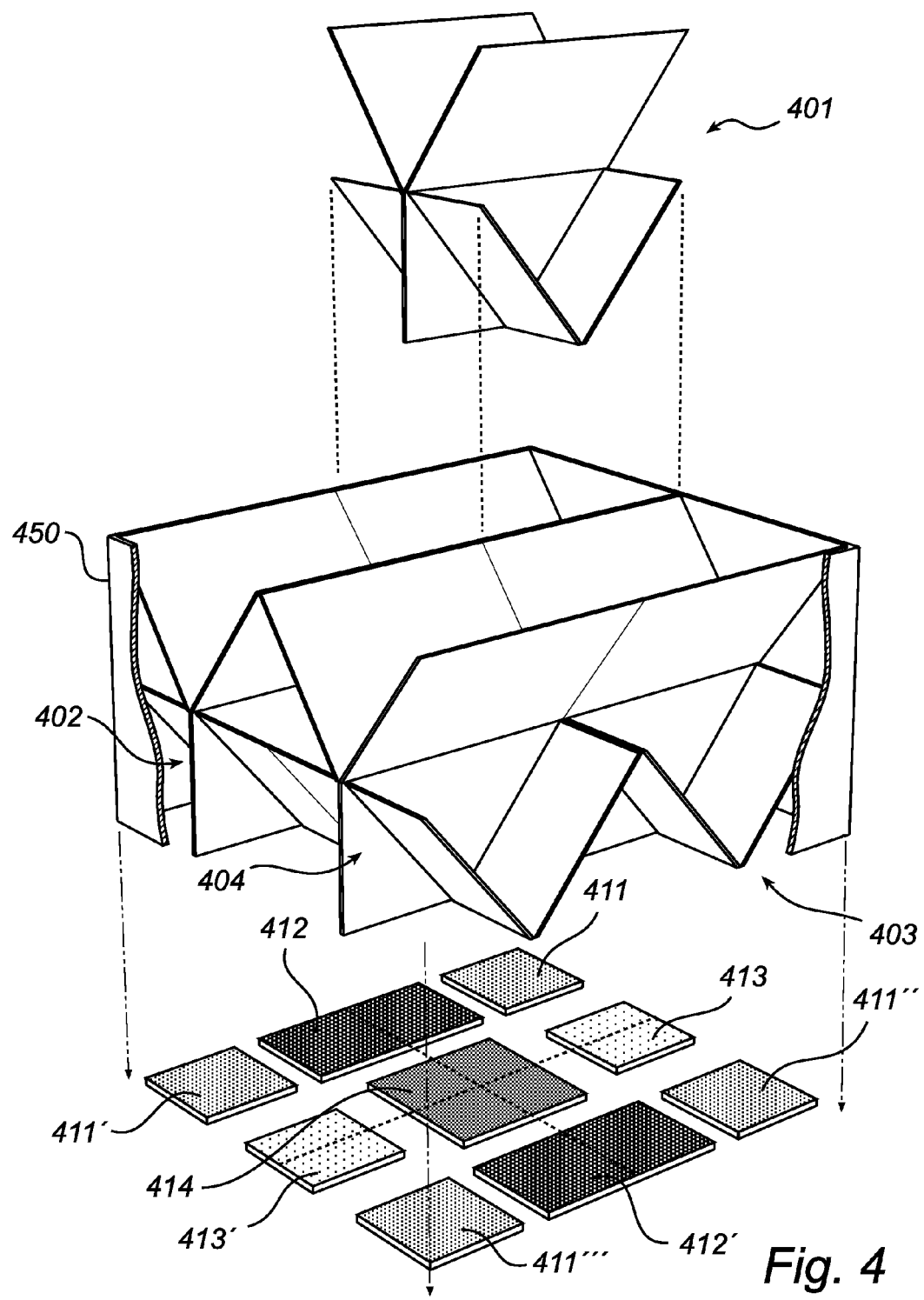
FIG. 4 illustrates an additional embodiment of a light-emitting device of the present invention.

A light-emitting device of the present invention may further comprise more than one set of the above-mentioned four light sources and three V-shaped profile surfaces. An embodiment comprising four such sets is illustrated in FIG. 4. In this embodiment, a first set 401, a second set 402, a third set 403 and a fourth set 404, all as described above in connection to FIG. 2 with a common jacket 450 being arranged around all four sets, jointly form a light-emitting device of the present invention.

As is illustrated in FIG. 4, some of the light sources in such a device may be common for more than one set. For instance, the light source 412 is common for the first set 401 and the second set 402, the light source 413 is common for the first set 401 and the third set 403, and the light source 414 is common for all four sets 401, 402, 403, 404.

In a preferred embodiment of a light-emitting device of the present invention, the light sources 411, 411', 411" and 411'" are green light-emitting diodes, the light sources 412 and 412' are red light-emitting diodes, the light sources 413 and 413' are blue light-emitting diodes and the light source 414 is an amber light-emitting diode. For producing white light from red, green, blue and amber light-emitting diodes with conventional light-emitting diodes presently available, a larger area emitting green light is required than the areas emitting blue and red, respectively. The design proposed in FIG. 4 provides a symmetrical structure and high design freedom.

As used herein, the term "dichroic filter" relates to a filter that reflects electromagnetic radiation of one or more wavelengths or wavelength ranges, and transmits other wavelengths or wavelength ranges, while maintaining a low, typically nearly zero, coefficient of absorption for all wavelengths of interest.

A dichroic filter may be of high-pass, low-pass, band-pass or band rejection type.

Thus a dichroic filter may be designed to reflect light of a first color or series of colors, while transmitting light of a second color, or series of colors.

Dichroic filters suitable for use in a brightness enhancing means of the present invention include dichroic filters known to those skilled in the art, and include a multilayer of materials that differ in the index of refraction.

Examples of such dichroic filters include such filters commonly known as "interference stacks", and comprise alternating layers of two or more materials having different index of refraction. For example, the thickness of each layer may typically be approximately equal to a quarter of the wavelength in air divided with the index of refraction, where the wavelength in air equals the dominant wavelength of the light for which the dichroic filter is adapted. One example of such an interference stack is made of alternating layers of $Ta_2O_5$ and $SiO_2$, but other material combinations are known to those skilled in the art.

Other examples of dichroic filters known to those skilled in the art and suitable for use in the present invention are such filters based on cholesteric liquid crystals, so called photonic crystals or holographic layers.

As used in the context of the present invention, a dichroic filter is matched to a lighting unit if the dichroic filter reflects wavelengths in the wavelength range emitted by the lighting unit while transmitting light of a different wavelength range.

For example, a dichroic filter adapted for green light may reflect green light while transmitting blue and red light.

It is not necessary that the emitted wavelength range and the reflected wavelength range are identical. The reflected wavelength range may for example be narrower than the emitted wavelength range, or may be broader than the emitted wavelength range.

Further, the dichroic filters may be non-ideal, i.e. not reflecting 100% of the light in the wavelength range in which the filter is to reflect light, and/or not transmitting 100% of the light in the wavelength range in which the filter is to transmit light. However, reflection and transmission efficiencies of above about 80%, such as about 90% is achievable.

The person skilled in the art realizes that the present invention by no means is limited to the preferred embodiments described above. On the contrary, many modifications and variations are possible within the scope of the appended claims. For example, the present invention is not limited to that the legs of the V-shaped profile surfaces are constituted by self-supporting wall-element. In alternative embodiments, theses surfaces, on which the dichroic filters are arranged, may be the surfaces of solid wave-guide, either forming the interface between the wave-guide and the atmosphere or forming an interface to an adjacent solid wave-guide.

Further, for ease of fabrication, small holes may be present in filters or small gaps may be present in between filters.

The edge of the first V-shaped profile surface can form any angle to the edge of the second V-shaped profile surface. In the above embodiments, the edges are parallel, i.e. forming a 0° angle, but any angle from 0 to 180° can be formed by the edges. Further, the angle between the reflecting surface, arranged between the first and the second V-shaped profile surfaces, to the edges of the V-shaped profile surfaces may be any angle from 0° (i.e. parallel) to 90° (i.e. perpendicular), and may be chosen independently for the first and the second V-shaped profile surface, for example such that the first profile surface is parallel while the second is perpendicular to the reflecting surface.

Further, an additional collimator may be arranged at the output side of the collimating element to further collimate light from the light-emitting device of the present invention.

Further, a light mixing means, typically in the form of a mixing rod which shape is adapted to the shape of the output side of the collimating element, may be arranged at the output side of the collimating element to further mix light from said collimating structure.

A light-emitting device of the present invention as a light source in many applications, for example, but not limited to, general lighting appliances, traffic lights, vehicle lights and display devices.

In an especially contemplated aspect, the present invention relates to a display device comprising two or more of the above-mentioned light-emitting devices. Typically in such display device, the light-emitting devices are independently addressable, for instance such that each light-emitting device, or a group of light-emitting devices represents a separate pixel of the display device. Light-emitting devices of the present invention may also serve as the light source in a projecting display device.

To summarize, the present invention provides a light-emitting device, comprising at least on set of four light sources and a collimating element for collimating and mixing the light from the light sources. The light-collimating element comprises three V-shaped profile surfaces arranged with their edges towards the light sources. The V-shaped profile surfaces are provided with dichroic filters that transmits light from the light sources that they are arranged in front of, and reflects light from the remaining light sources.

Such a device is capable of collimating and mixing the light from the four light sources, such that essentially the same degree of collimation is achieved for all four light sources.

The invention claimed is:

1. A light-emitting device, comprising:
   a first light source adjacent to a second light source,
   a third light source adjacent to a fourth light source, and
   a light collimating element having a receiving side facing said light sources and an opposite output side, wherein said light collimating element comprises:
   a first V-shaped profile surface arranged in front of said first and second light sources with its edge towards said receiving side, such that the first leg of said first V-shaped profile surface is arranged in front of said first light source and comprises a dichroic filter transmissive for light from said first light source and reflective for light from said second light source, and the second leg of said first V-shaped profile surface is arranged in front of said second light source and comprises a dichroic filter transmissive for light from said second light source and reflective for light from said first light source;
   a second V-shaped profile surface arranged in front of said third and fourth light sources with its edge towards the receiving side, such that the first leg of said second V-shaped profile surface is arranged in front of said third light source and comprises a dichroic filter transmissive for light from said third light source and reflective for light from said fourth light source, and the second leg of said second V-shaped profile surface is arranged in front of said fourth light source and comprises a dichroic filter transmissive for light from said fourth light source and reflective for light of said third light source;
   a reflecting surface having an extension in the direction of light, arranged between said first and second V-shaped profile surfaces; and
   a third V-shaped profile surface arranged in front of said first and second V-shaped profile surfaces with its edge towards said receiving side, such that the first leg of said third V-shaped profile surface is arranged in front of said first V-shaped profile surface and comprises a dichroic filter transmissive for light from said first and second light sources and reflective for light from said third and fourth light sources, and the second leg of said third V-shaped profile surface is arranged in front of said second V-shaped profile surface and comprises a dichroic filter transmissive for light from said third and fourth light sources and reflective for light from said first and second light sources.

2. A light-emitting device according to claim 1, wherein the edge of said third V-shaped profile surface is parallel to the extension, across the main direction of light propagation, of said reflecting surface.

3. A light-emitting device according to claim 1, wherein the edge of said first V-shaped profile surface and/or the edge said second V-shaped profile surface is parallel to the edge of said third V-shaped surface.

4. A light-emitting device according to claim 1, wherein the edge of said first V-shaped profile surface and/or the edge of said second V-shaped profile surface is perpendicular to the edge of said third V-shaped surface.

5. A light-emitting device according to claim 1, wherein said collimating element is arranged in a jacket comprising sidewalls.

6. A light-emitting device according to claim 5, wherein surfaces of said jacket sidewalls facing the collimating element are reflecting.

7. A light-emitting device according to claim 1, wherein each of said dichroic filters comprises interference stacks of alternating layers of materials having different refractive indices.

\* \* \* \* \*